United States Patent
Xie et al.

(10) Patent No.: US 11,488,019 B2
(45) Date of Patent: Nov. 1, 2022

(54) LOSSLESS MODEL COMPRESSION BY BATCH NORMALIZATION LAYER PRUNING IN DEEP NEURAL NETWORKS

(71) Applicant: Kneron (Taiwan) Co., Ltd., Taipei (TW)

(72) Inventors: Bike Xie, San Diego, CA (US); Junjie Su, San Diego, CA (US); Bodong Zhang, Shenyang (CN); Chun-Chen Liu, San Diego, CA (US)

(73) Assignee: Kneron (Taiwan) Co., Ltd., Taipei (TW)

( * ) Notice: Subject to any disclaimer, the term of this patent is extended or adjusted under 35 U.S.C. 154(b) by 702 days.

(21) Appl. No.: 16/255,850

(22) Filed: Jan. 24, 2019

(65) Prior Publication Data
US 2019/0370656 A1    Dec. 5, 2019

Related U.S. Application Data

(60) Provisional application No. 62/267,971, filed on Jun. 3, 2018.

(51) Int. Cl.
*G06N 3/08* (2006.01)
*G06N 3/04* (2006.01)

(52) U.S. Cl.
CPC ........... *G06N 3/082* (2013.01); *G06N 3/04* (2013.01)

(58) Field of Classification Search
CPC .................. G06N 3/082; G06N 3/04
USPC .................................................... 706/25
See application file for complete search history.

(56) References Cited

U.S. PATENT DOCUMENTS

| | | | | |
|---|---|---|---|---|
| 2016/0321541 | A1* | 11/2016 | Liu | G06F 40/20 |
| 2019/0050734 | A1* | 2/2019 | Li | G06N 3/0454 |
| 2019/0355128 | A1* | 11/2019 | Grauman | G06K 9/00765 |
| 2020/0311549 | A1* | 10/2020 | Wang | G06N 3/082 |

OTHER PUBLICATIONS

Molchanov et al., "Pruning convolutional neural networks for resource efficient inference", ICLR 2017 (Year: 2017).*

* cited by examiner

*Primary Examiner* — Tsu-Chang Lee
(74) *Attorney, Agent, or Firm* — Winston Hsu

(57) ABSTRACT

A method of pruning a batch normalization layer from a pre-trained deep neural network model is proposed. The pre-trained deep neural network model is inputted as a candidate model. The candidate model is pruned by removing the at least one batch normalization layer from the candidate model to form a pruned candidate model only when the at least one batch normalization layer is connected to and adjacent to a corresponding linear operation layer. The corresponding linear operation layer may be at least one of a convolution layer, a dense layer, a depthwise convolution layer, and a group convolution layer. Weights of the corresponding linear operation layer are adjusted to compensate for the removal of the at least one batch normalization. The pruned candidate model is then output and utilized for inference.

18 Claims, 2 Drawing Sheets

LOSSLESS MODEL COMPRESSION BY BATCH NORMALIZATION LAYER PRUNING IN DEEP NEURAL NETWORKS

CROSS REFERENCE TO RELATED APPLICATIONS

This application claims the benefit if U.S. Provisional Patent Application No. 62/679,971 filed Jun. 3, 2018, and included herein by reference in its entirety.

BACKGROUND OF THE INVENTION

1. Field of the Invention

This application relates to deep neural networks having at least one batch normalization layer, and more specifically, relates to a device and method of pruning a batch normalization layer from a pre-trained deep neural network.

2. Description of the Prior Art

A large-scale deep neural network (DNN) has achieved remarkable performance on the cutting-edge tasks in the fields of computer vision, image recognition, and speech recognition. However, these modern DNNs with good performance often contain many layers (deep), have a very big model size, and require high computational intensity. These characteristics make it impossible or very difficult to deploy the DNNs on resource-limited end-user devices with low memory storage and computational capabilities, such as mobile phones and embedded devices.

The modern DNNs such as ResNet, MobileNet, GoogLeNet, Xception network, ResNext contain multiple batch normalization layers. These batch normalization layers are usually put right before or right after convolution layers, dense layers, or depthwise convolution layers to help neural network training converge. However, during the model inference stage, these batch normalization layers consume considerable time, computation, and cause extra latency. The implementation of DNNs having batch normalization layers is challenging in all types of hardware such as a central processing unit (CPU), a graphics processing unit (GPU), a digital signal processor (DSP), a field-programmable gate array (FPGA), and an Application-Specific Integrated Circuit (ASIC).

SUMMARY OF THE INVENTION

To address the above prior art problems, a method of pruning a batch normalization layer from a pre-trained deep neural network model is proposed. The deep neural network model comprises a plurality of layers including at least one batch normalization layer. The pre-trained deep neural network model is inputted as a candidate model. The candidate model is pruned by removing the at least one batch normalization layer from the candidate model to form a pruned candidate model when the at least one batch normalization layer is connected to and adjacent to a corresponding linear operation layer. The corresponding linear operation layer may be at least one of a convolution layer, a dense layer, a depthwise convolution layer, and a group convolution layer. Weights of the corresponding linear operation layer are adjusted to compensate for the removal of the at least one batch normalization layer such that inference accuracy of the pruned candidate model is substantially the same as inference accuracy of the pre-trained deep neural network model. The pruned candidate model is then output and utilized for inference.

The method may further comprise removing each of a plurality of batch normalization layers and adjusting corresponding weights when said each batch normalization layer is connected to and adjacent to a corresponding linear operation layer. Each of the at least one batch normalization layer may be processed individually. The at least one batch normalization layer and weights of adjacent layers are maintained when the at least one batch normalization layer is not connected to and adjacent to a corresponding linear operation layer.

A device may be configured to prune a batch normalization layer from a pre-trained deep neural network model. The deep neural network model comprises a plurality of layers including at least one batch normalization layer. The device may comprise a processor and a non-transitory memory electrically coupled to the processor, the memory comprising computer code, which when executed by the processor causes the processor to perform the steps of inputting the pre-trained deep neural network model as a candidate model, pruning the candidate model by removing the at least one batch normalization layer from the candidate model to form a pruned candidate model when the at least one batch normalization layer is connected to and adjacent to a corresponding linear operation layer, adjusting weights of the corresponding linear operation layer to compensate for the removal of the at least one batch normalization layer such that inference accuracy of the pruned candidate model is substantially the same as inference accuracy of the pre-trained deep neural network model, and outputting the pruned candidate model for inference utilization.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
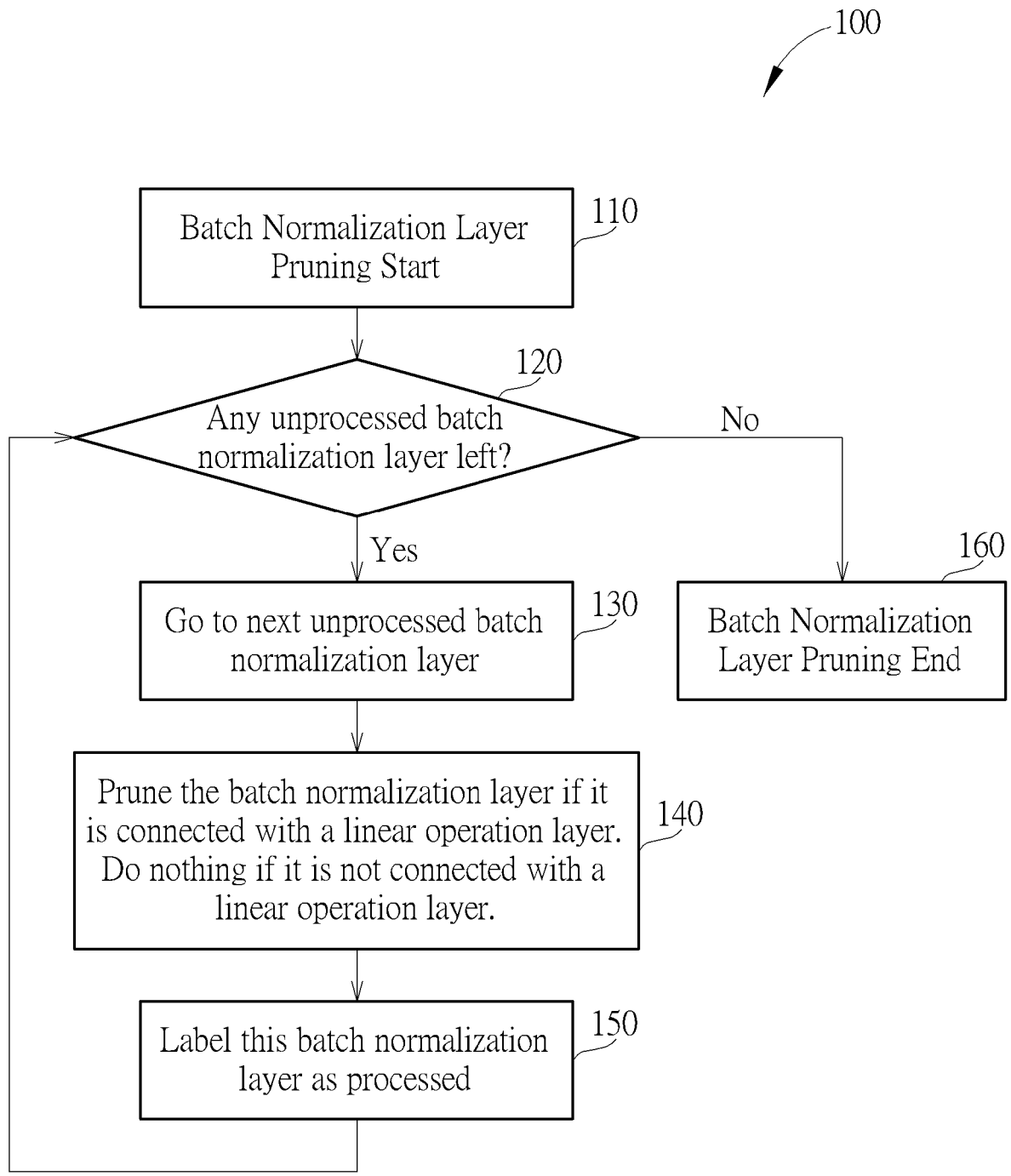
FIG. 1 illustrates a batch normalization layer pruning technique according to an embodiment.

To address the problems of implementation of DNNs trained with batch normalization layers in devices having limited resources, we propose a novel batch normalization layer pruning technology (BN_PRUNE) which losslessly compresses the DNN model by pruning any batch normalization layer which connects with a linear layer including but not limited to convolution layers, dense layers, depthwise convolution layers, and group convolution layers.

Furthermore, this batch normalization layer pruning technology does not change the other layers' structure in the DNN, and hence, this BN_PRUNE technique can be directly and easily deployed into all existing DNN implementation platforms such as, inter alia, a CPU, a GPU, a DSP, an ASIC, and a FPGA.

Before revealing the details of BN_PRUNE technology, here are summarized major claims (but not all claims) of this patent application.

We claim a novel batch normalization pruning technique for model inference. This BN_PRUNE technique applies to any neural network with batch normalization layers.

We claim that this BN_PRUNE technique can prune the whole batch normalization layer when this layer connects to (is right before or right after) any linear operation layer. Linear operation layers include but are not limited to convolution layers, dense layers, depthwise convolution layers, and group convolution layers.

We claim that this BN_PRUNE technique can speed up neural network inference implementation on any type of hardware platform, particularly platforms having limited resources such as a CPU, GPU, DSP, FPGA, and ASIC.

We claim that this BN_PRUNE technique is lossless as the neural network output results are exactly the same before and after applying BN_PRUNE technique if not considering numerically computing precision.

A batch normalization layer has N input features and the same amount (N) of output features. For each input feature x, the batch normalization process has y parameters where:

$$y = \frac{x - E[x]}{\sqrt{Var[x] + eps}} * \text{gamma} + \text{beta} \quad (1)$$

E[x] is the moving mean of input feature x and Var[x] is the moving variance of x. eps a given small number. gamma and beta are trained parameters. For model inference, all these parameters are already determined. Therefore, the batch normalization process can be simplified as:

$$y = x * a + b \quad (2)$$

where $$a = \frac{\text{gamma}}{\sqrt{Var[x] + eps}} \quad (3)$$

and $$b = \text{beta} - \frac{\text{gamma} * E[x]}{\sqrt{Var[x] + eps}} \quad (4)$$

If a linear operation layer with K input features and N output features is right before the batch normalization layers, then we can represent this linear operation layer as:

$$x_i = \left(\sum_j A_{ij} * z_j\right) + b_i \quad (5)$$

where $x_i$ is the ith output feature represented as a column vector, $z_j$ is the jth input feature represented as a column vector, $b_i$ is the bias for ith output feature represented as a scalar and $+b_i$ is element-wise addition, $A_{ij}$ is the linear kernel (matrix) from jth input feature to the ith output feature. For dense layers, $A_{ij}$ is a scaler (1-by-1 matrix) which is exactly the weight on the branch connecting the jth input node to the ith output node. For convolution layers, the convolution operation is expanded as a linear matrix multiplication where $A_{ij}$ is an expanded matrix according to the convolution operation. Depthwise convolution layers and group convolution layers have the similar representation as convolution layers except some $A_{ij}$ matrices are a zero matrix if there is no connection between the ith output feature and the jth input feature.

The output of the combination of the linear operation layer and the batch normalization layer is then:

$$y_i = x_i * a + b \quad (6)$$

which equals $$y_i = \left(\sum_j (A_{ij} * z_j) + b_i\right) * a + b \quad (7)$$

which equals $$y_i = \left(\sum_j ((A_{ij} * a) * z_j)\right) + (b + b_i * a) \quad (8)$$

Here $(b+b_j*a)$ is a scalar and the addition of $(b+b_j*a)$ is an element-wise addition. This formula indicates that if we prune the batch normalization layer and adjust the weights of linear operation layer as $A_{ij} \rightarrow A_{ij}*a$ (scale operation) and $b_i \rightarrow b+b_i*a$, then the output features of the weight adjusted linear operation layer are exactly the same as those of the combination of original linear operation layer and batch normalization layer. Note that here a and b are scalers. Hence, these types of weight adjustment can be easily applied to convolution layers, dense layers, depthwise convolution layers and group convolution layers.

Here we can claim that when the batch normalization layer is right after a linear operation layer such as convolution layers, dense layers, depthwise convolution layers, and group convolution layers, the proposed method can prune the batch normalization layer, adjust the weights of the linear operation layer, and guarantee that the output features of the weight adjusted linear operation layer are the same as the output features of the combination of original linear operation layer and batch normalization layer.

If a linear operation layer with N input features and L output features is right after the batch normalization layers, then we can represent this linear operation layer as $$z_i = \left(\sum_j A_{ij} * y_j\right) + b_i \quad (9)$$

where $z_i$ is the ith output feature represented as a column vector, $y_j$ is the jth input feature represented as a column vector, $b_i$ is the bias of ith output feature also represented as a column vector.

The output of the combination of the batch normalization layer and the linear operation layer is then $$z_i = \left(\sum_j (A_{ij} * y\_j)\right) + b_i \quad (10)$$

which equals $$z_i = \left(\sum_j (A_{ij} * (x_j * a + b))\right) + b_i \quad (11)$$

which equals $$z_i = \left(\sum_j ((A_{ij} * a) * x_j)\right) + \left(b_i + \sum_j A_{ij} * t\right) * b \quad (12)$$

where t is an all-one column vector. This formula indicates that if we prune the batch normalization layer and adjust the weights of linear operation layer as $A_{ij} \to A_{ij} * a$ (scale operation) and $b_i \to b_i + \text{sum\_j} (A_{ij} * t) * b$, then the output features of the weight adjusted linear operation layer are exactly the same as those of the combination of original linear operation layer and batch normalization layer. Note that here a, b, $b_i$ are scalers. Hence, these types of weight adjustment can be easily applied to convolution layers, dense layers, depthwise convolution layers and group convolution layers. For example, for convolution layers, group convolution layers and depthwise convolution layers, $b_i \to b_i + \text{sum\_j}(A_{ij} * t) * b$ can be simplified as $b_i \to b_i + \text{sum}(\text{conv. kernel weights from jth input to ith output}) * b$. For dense layers, $b_i \to b_i + \text{sum\_j}(A_{ij} * t) * b$ can be simplified as $b_i \to b_i + A_{ij} * b$ where $A_{ij}$ is the weight on the branch from jth input node to ith output node.

Here we can claim that when the batch normalization layer is right before a linear operation layer such as convolution layers, dense layers, depthwise convolution layers, and group convolution layers, the proposed method can prune the batch normalization layer, adjust the weights of the linear operation layer, and guarantee that the output features of weight adjusted linear operation layer are the same as the output features of the combination of original linear operation layer and batch normalization layer.

The batch normalization pruning scheme 100 is shown in FIG. 1. Step 110 starts the process. Next in step 120, check through each batch normalization layer one by one. If no unprocessed batch normalization layer remains, end the process in step 160, else go to the next unprocessed batch normalization layer in step 130. If the next unprocessed batch normalization layer connects with a linear operation layer such as convolution layer, dense layer, depthwise convolution, group convolution layer, then in step 140, prune this batch normalization layer using the BN_PRUNE method described in this patent, update the weights in the corresponding linear operation layer, and update the neural network model structure. If a batch normalization layer does not connect with a linear operation layer, leave the batch normalization layer as is. In step 150, label the unprocessed batch normalization layer as processed and return to step 120.

Figure 2:
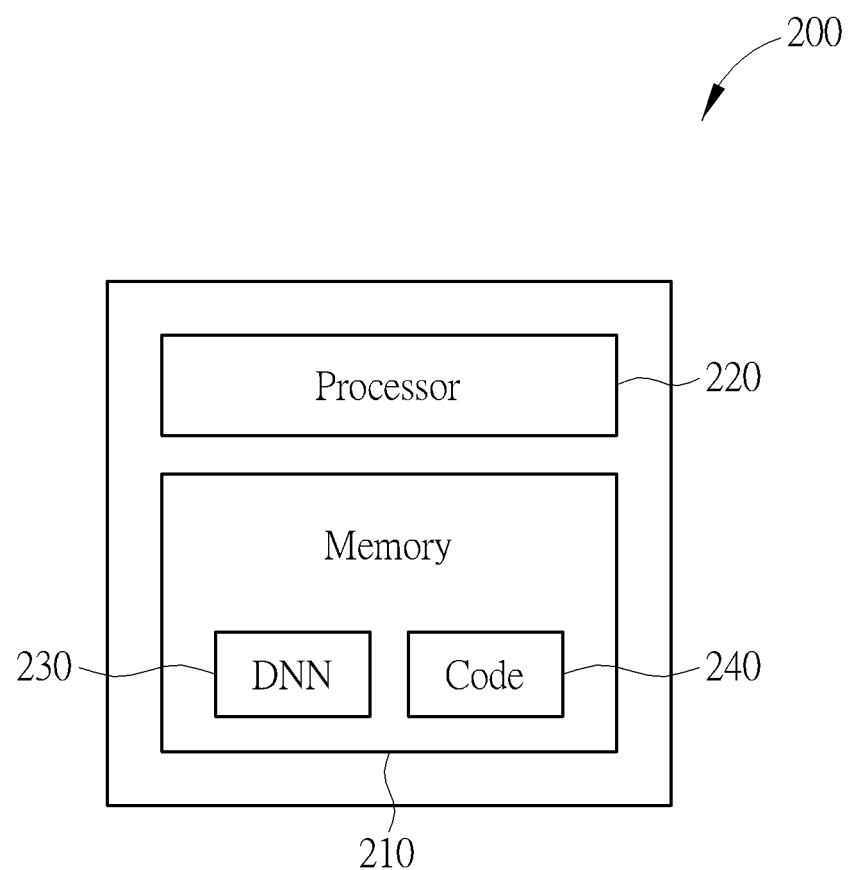
FIG. 2 is a block diagram of a device configured to implement the batch normalization layer pruning technique of FIG. 1.

The batch normalization pruning scheme 100 can be implemented in a device 200 as shown in FIG. 2. Device 200 may include a processor 220 coupled to a memory 210 and all necessary connections and ports for performing the batch normalization pruning scheme 100. The memory 210 may or may not be transitory and may comprise at least one of a DNN 230 and computer code 240. The computer code 240, when executed by the processor, causes the processor to perform the steps shown in FIG. 1 and described above.

The device 200 may also represent a device configured to utilize a DNN 230 that has been already pruned according to the batch normalization pruning scheme 100 for inference.

The batch normalization layer pruning (BN_PRUNE) method disclosed herein offers distinct advances over conventional technology in the field of Neural Networks. Because the method begins with a pre-trained model as input, convergence and accuracy are already present in the model. By pruning batch normalization layers connecting with a linear operation layer in a pre-trained DNN, the size of the DNN is reduced and implementation requirements, such as memory, hardware, or processing necessities, are also reduced. Furthermore, because of the disclosed method of pruning batch normalization layers in a DNN, inference can be achieved with much increased speed and much decreased computational requirements. Lastly, due to the disclosed method of pruning batch normalization layers in a DNN, these benefits occur while guaranteeing accuracy during inference.

All in all, we propose a novel batch normalization layer pruning (BN_PRUNE) method which lossless compresses the DNN model by pruning any batch normalization layer which connects with a linear layer including but not limited to convolution layers, dense layers, depthwise convolution layers, and group convolution layers. Furthermore, this batch normalization layer pruning technology does not change the other layers' structure in the DNN, and hence, this BN_PRUNE technique can be directly and easily deployed into all existing DNN implementation platforms such as a CPU, a GPU, a DSP, an ASIC, and an FPGA.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of pruning a batch normalization layer from a pre-trained deep neural network model, the pre-trained deep neural network model comprising a plurality of layers including at least one batch normalization layer, the method comprising:
 inputting the pre-trained deep neural network model to a non-transitory memory as a candidate model by a processor;
 receiving electronic signals of the pre-trained deep neural network model by the processor;
 pruning the candidate model by removing the at least one batch normalization layer from the candidate model to form a pruned candidate model by the processor when the at least one batch normalization layer is connected to and adjacent to a corresponding linear operation layer;
 adjusting weights of the corresponding linear operation layer to compensate for the removal of the at least one batch normalization layer by the processor such that inference accuracy of the pruned candidate model is substantially the same as inference accuracy of the pre-trained deep neural network model in the non-transitory memory according to the electronic signals of the pre-trained deep neural network model by the processor; and
 outputting the pruned candidate model by the processor for inference utilization;
 wherein the pre-trained deep neural network model and the pruned candidate model are implemented by a plurality of linear operators integrated in a field-programmable gate array (FPGA).

2. The method of claim 1 wherein the corresponding linear operation layer is at least one of a convolution layer, a dense layer, a depthwise convolution layer, and a group convolution layer.

3. The method of claim 1 wherein the pre-trained deep neural network model comprises a plurality greater than one of batch normalization layers and the method further comprises removing each of the plurality of batch normalization layers from the candidate model to form the pruned candidate model when said each batch normalization layer is connected to and adjacent to a corresponding linear operation layer.

4. The method of claim 3 further comprising adjusting weights of the linear operation layer of the pruned candidate model corresponding with each batch normalization layer removed from the candidate model to compensate for the removal of the batch normalization layers such that inference accuracy of the pruned candidate model is substantially the same as inference accuracy of the pre-trained deep neural network model.

5. The method of claim 1 further comprising removing the at least one batch normalization layer from the candidate model without changing structure of layers in the DNN that are not a batch normalization layer.

6. The method of claim 1 further comprising pruning the candidate model by removing the at least one batch normalization layer from the candidate model to form a pruned candidate model when the at least one batch normalization layer is connected to and adjacent to a preceding corresponding linear operation layer.

7. The method of claim 1 further comprising pruning the candidate model by removing the at least one batch normalization layer from the candidate model to form a pruned candidate model when the at least one batch normalization layer is connected to and adjacent to a following corresponding linear operation layer.

8. The method of claim 1 further comprising removing the at least one batch normalization layer from the candidate model to form a pruned candidate model only when the at least one batch normalization layer is connected to and adjacent to a corresponding linear operation layer.

9. The method of claim 1 further comprising individually processing each of the at least one batch normalization layer, wherein individually processing each of the at least one batch normalization layer comprises:
   removing the at least one batch normalization layer from the candidate model and adjusting weights of the corresponding linear operation layer only when the at least one batch normalization layer is connected to and adjacent to a corresponding linear operation layer; and
   maintaining the at least one batch normalization layer and weights of adjacent layers when the at least one batch normalization layer is not connected to and adjacent to a corresponding linear operation layer.

10. A device configured to prune a batch normalization layer from a pre-trained deep neural network model, the pre-trained deep neural network model comprising a plurality of layers including at least one batch normalization layer, the device comprising:
   a processor; and
   a non-transitory memory electrically coupled to the processor, the memory comprising computer code, which when executed by the processor causes the processor to perform the steps of:
      inputting the pre-trained deep neural network model to the non-transitory memory as a candidate model;
      receiving electronic signals of the pre-trained deep neural network model;
      pruning the candidate model by removing the at least one batch normalization layer from the candidate model to form a pruned candidate model when the at least one batch normalization layer is connected to and adjacent to a corresponding linear operation layer;
      adjusting weights of the corresponding linear operation layer to compensate for the removal of the at least one batch normalization layer such that inference accuracy of the pruned candidate model is substantially the same as inference accuracy of the pre-trained deep neural network model in the non-transitory memory according to the electronic signals of the pre-trained deep neural network model by the processor; and
      outputting the pruned candidate model for inference utilization;
   wherein the pre-trained deep neural network model and the pruned candidate model are implemented by a plurality of linear operators integrated in a field-programmable gate array (FPGA).

11. The device of claim 10 wherein the corresponding linear operation layer is at least one of a convolution layer, a dense layer, a depthwise convolution layer, and a group convolution layer.

12. The device of claim 10 wherein the pre-trained deep neural network model comprises a plurality greater than one of batch normalization layers and the computer code, which when executed by the processor, further causes the processor to further perform a step of removing of each of the plurality of batch normalization layers from the candidate model to form the pruned candidate model when said each batch normalization layer is connected to and adjacent to a corresponding linear operation layer.

13. The device of claim 12 wherein the computer code, which when executed by the processor causes the processor to further perform a step of adjusting weights of the linear operation layer of the pruned candidate model corresponding with each batch normalization layer removed from the candidate model to compensate for the removal of the batch normalization layers such that inference accuracy of the pruned candidate model is substantially the same as inference accuracy of the pre-trained deep neural network model.

14. The device of claim 10 wherein the computer code, which when executed by the processor causes the processor to further perform a step of removing the at least one batch normalization layer from the candidate model without changing structure of layers in the DNN that are not a batch normalization layer.

15. The device of claim 10 wherein the computer code, which when executed by the processor, causes the processor to further perform a step of pruning the candidate model by removing the at least one batch normalization layer from the candidate model to form a pruned candidate model when the at least one batch normalization layer is connected to and adjacent to a preceding corresponding linear operation layer.

16. The device of claim 10 wherein the computer code, which when executed by the processor, causes the processor to further perform a step of pruning the candidate model by removing the at least one batch normalization layer from the candidate model to form a pruned candidate model when the at least one batch normalization layer is connected to and adjacent to a following corresponding linear operation layer.

17. The device of claim 10 wherein the computer code, which when executed by the processor, causes the processor to further perform a step of removing the at least one batch normalization layer from the candidate model to form a pruned candidate model only when the at least one batch normalization layer is connected to and adjacent to a corresponding linear operation layer.

18. The device of claim 10 wherein the computer code, which when executed by the processor, causes the processor to further perform a step of individually processing each of the at least one batch normalization layer, wherein individually processing each of the at least one batch normalization layer comprises:
    removing the at least one batch normalization layer from the candidate model and adjusting weights of the corresponding linear operation layer only when the at least one batch normalization layer is connected to and adjacent to a corresponding linear operation layer; and
    maintaining the at least one batch normalization layer and weights of adjacent layers when the at least one batch normalization layer is not connected to and adjacent to a corresponding linear operation layer.

* * * * *

UNITED STATES PATENT AND TRADEMARK OFFICE
CERTIFICATE OF CORRECTION

| | | |
|---|---|---|
| PATENT NO. | : 11,488,019 B2 | Page 1 of 1 |
| APPLICATION NO. | : 16/255850 | |
| DATED | : November 1, 2022 | |
| INVENTOR(S) | : Bike Xie et al. | |

It is certified that error appears in the above-identified patent and that said Letters Patent is hereby corrected as shown below:

On the Title Page

Item (60), correct the provisional application number of the Related U.S. Application Data from "62/267,971" to --62/679,971--.

Signed and Sealed this
Third Day of January, 2023

Katherine Kelly Vidal
*Director of the United States Patent and Trademark Office*